(12) United States Patent
Gaskin

(10) Patent No.: US 7,337,631 B2
(45) Date of Patent: Mar. 4, 2008

(54) USE OF CRYOGENIC TEMPERATURES IN PROCESSING GASES CONTAINING LIGHT COMPONENTS WITH PHYSICAL SOLVENTS

(75) Inventor: Thomas K. Gaskin, Spring, TX (US)

(73) Assignee: Advanced Extraction Technologies, Inc., Houston, TX (US)

( * ) Notice: Subject to any disclaimer, the term of this patent is extended or adjusted under 35 U.S.C. 154(b) by 426 days.

(21) Appl. No.: 11/076,356

(22) Filed: Mar. 9, 2005

(65) Prior Publication Data

US 2005/0198999 A1   Sep. 15, 2005

Related U.S. Application Data

(60) Provisional application No. 60/552,411, filed on Mar. 11, 2004.

(51) Int. Cl.
*F25J 3/00* (2006.01)
(52) U.S. Cl. .............. 62/632; 62/625; 62/635
(58) Field of Classification Search .............. 62/625, 62/632, 634, 635, 636
See application file for complete search history.

(56) References Cited

U.S. PATENT DOCUMENTS

| | | | | |
|---|---|---|---|---|
| 2,327,187 A | * | 8/1943 | Hill .............................. | 208/346 |
| 2,529,312 A | | 11/1950 | Rupp ........................... | 62/175.5 |
| 2,603,310 A | | 7/1952 | Gilmore ..................... | 183/115.6 |
| 3,026,682 A | | 3/1962 | Palazzo et al. ................ | 62/17 |
| 3,026,683 A | | 3/1962 | Palazzo et al. ................ | 62/17 |
| 3,062,015 A | * | 11/1962 | Cost ............................... | 62/635 |
| 3,121,624 A | | 2/1964 | Matsch et al. .................. | 55/44 |
| 3,373,574 A | | 3/1968 | Fisher ............................ | 62/20 |
| 3,455,116 A | | 7/1969 | Swift et al. ..................... | 62/17 |
| 4,421,535 A | | 12/1983 | Mehra ............................ | 62/17 |
| 4,428,759 A | | 1/1984 | Ryan et al. ..................... | 62/17 |
| 4,498,911 A | | 2/1985 | Deal et al. ...................... | 55/32 |
| 4,511,381 A | | 4/1985 | Mehra ............................ | 62/17 |
| 4,526,594 A | | 7/1985 | Mehra ............................ | 62/17 |
| 4,578,094 A | | 3/1986 | Mehra ............................ | 62/17 |
| 4,588,427 A | * | 5/1986 | Yao et al. ...................... | 62/634 |
| 4,601,738 A | | 7/1986 | Mehra ............................ | 62/17 |
| 4,617,038 A | | 10/1986 | Mehra ............................ | 62/17 |
| 4,623,371 A | | 11/1986 | Mehra ............................ | 62/17 |
| 4,692,179 A | | 9/1987 | Mehra ............................ | 62/17 |
| 4,696,688 A | | 9/1987 | Mehra ............................ | 62/17 |
| 4,740,222 A | | 4/1988 | Mehra ............................ | 62/17 |
| 4,810,267 A | | 3/1989 | Landeck et al. ............... | 55/73 |

(Continued)

OTHER PUBLICATIONS

International Search Report and Written Opinion of the International Searching Authority, Mailed Jun. 22, 2005, For Corresponding PCT Application Serial No. PCT/US2005/007736, filed Mar. 9, 2005.

*Primary Examiner*—William C Doerrler
(74) *Attorney, Agent, or Firm*—Howrey LLP

(57) ABSTRACT

A process for separating the components of a multi-component gas stream is disclosed. The multi-component gas stream is contacted with a solvent in an extractor at cryogenic temperatures to produce an overhead stream enriched with unabsorbed component(s) and a rich solvent bottoms stream enriched with absorbed component(s). The rich solvent bottoms stream is then flash evaporated to regenerate the lean solvent and to recover the absorbed component(s) as an overhead stream, which is compressed to produce a product stream. The regenerated solvent is recycled to the extractor.

35 Claims, 9 Drawing Sheets

U.S. PATENT DOCUMENTS

| | | | |
|---|---|---|---|
| 4,832,718 A | 5/1989 | Mehra | 62/17 |
| 4,971,607 A | 11/1990 | Gazzi et al. | 55/43 |
| 5,141,544 A | 8/1992 | Butts | 62/23 |
| 5,257,505 A | 11/1993 | Butts | 62/24 |
| 5,321,952 A | 6/1994 | Forte | 62/17 |
| 5,375,422 A | 12/1994 | Butts | 62/24 |
| 5,406,802 A | 4/1995 | Forte | 62/17 |
| 5,462,583 A | 10/1995 | Wood et al. | 95/192 |
| 5,551,972 A | 9/1996 | Wood et al. | 95/192 |
| 5,687,584 A * | 11/1997 | Mehra | 62/632 |
| 6,698,237 B2 | 3/2004 | Gaskin | 62/632 |

* cited by examiner

USE OF CRYOGENIC TEMPERATURES IN PROCESSING GASES CONTAINING LIGHT COMPONENTS WITH PHYSICAL SOLVENTS

CROSS REFERENCE TO RELATED APPLICATIONS

This application is a non-provisional of Provisional Application Ser. No. 60/552,411, filed Mar. 11, 2004, the entire contents of which are incorporated herein by reference

FIELD OF THE INVENTION

The invention relates to the field of chemical processing and, more specifically, to the processing of hydrocarbon gas streams. In particular, a method and apparatus for separating the components of a hydrocarbon gas stream using a cryogenic extraction step is disclosed.

BACKGROUND OF THE INVENTION

Many hydrocarbon gases such as natural gas, cracked gas, or refinery off gas contain one or more light components that either contaminate the main gas or that are themselves valuable if they can be separated from the main gas stream. Such light gases include nitrogen, helium, and hydrogen. A number of economic considerations make it desirable to separate these light gases from a hydrocarbon gas stream.

For example, contamination of natural gas with one or more light components is particularly common. Natural gas is a mixture of hydrocarbons, including methane ethane, propane, butane and pentane. Natural gas can also contain nitrogen, helium, and acid gases such as carbon dioxide and hydrogen sulfide. Nitrogen is sometimes a natural component or may derive from nitrogen injections utilized for reviving oil wells in suitable formations. Helium occurs naturally in a small portion of natural gas reservoirs. Natural gas must meet certain criteria for acid gas content, heating value, dew point, and total inert content before the natural gas can be transported and marketed. Nitrogen content is often limited to less than 2-4% molar. Nitrogen must therefore be removed from natural gas containing more than the specified amount or the natural gas cannot be transported and marketed.

Natural gas is also produced in association with crude oil production as associated gas. This associated gas may contain naturally occurring nitrogen or may contain injected nitrogen used to enhance oil recovery. Associated gas must meet the same criteria as natural gas if the associated gas is to be transported and marketed.

Refinery and chemical plant streams often contain a number of light components such as nitrogen and hydrogen. Hydrogen is commonly contained in gas streams in refinery units. Hydrogen is added to some refinery operations and is produced as a side-product in other refinery unit operations. It is often desirable to separate this hydrogen from the refinery off gas because removed and recovered hydrogen can be recycled within the facility or sold, typically for a higher value than the heating value of the hydrogen in a refinery or chemical plant hydrocarbon stream. Likewise, removing nitrogen from the plant stream increases the heating value of the remaining hydrocarbon stream and potentially increases the stream's value as a fuel stream.

It may also be desirable to separate a wide variety of other gas streams into light and heavy components. Examples of such streams include syngases, gasification gases, and chemical streams including components such as hydrogen, nitrogen, carbon dioxide, carbon monoxide, argon, methane, ethane, and unsaturated hydrocarbons such as ethylene and propylene. It is often desirable to provide a gas stream that is of given purity with regard to a specific gas. Some streams are integral parts of a specific process, such as those recycled from a fractionating tower to a reactor. Such a recycle stream can be an impure hydrogen stream that must be purified before returning to the reactor and/or combining with a make-up hydrogen stream. Other gaseous streams can be the byproduct of a refinery, chemical, or gasification process and can be sent to one or more other processes which can make use of a separated light component such as hydrogen. For example, the byproduct hydrogen stream from an ethylene cracking plant may have a hydrogen content of 75 mol % whereas the feed to a hydrodealkylation process may require 95 mol % hydrogen. A change in process conditions at a nearby hydroforming plant may create a demand for 99 mol % hydrogen and therefore require the purification of an existing 90 mol % hydrogen stream available nearby.

Separation of light components such as hydrogen or nitrogen from heavier components such as methane and ethane can increase the value of either or both of the resulting separate streams. Existing technologies for performing such separations, include selective membranes, adsorption systems such a pressure swing adsorption, and systems that utilize very low temperatures (cryogenic plants) such as expander, Joule-Thompson (JT), or cascaded refrigeration plants. The afore-mentioned processes do not utilize a solvent for absorption of components. A typical process for cryogenic separation of nitrogen from natural gas without use of solvents is described in U.S. Pat. Nos. 5,141,544, 5,257,505, and 5,375,422.

Absorption using a physical solvent to remove the heavier components and therefore separate them from the light components, known as the Mehra Process(tm), can be employed. The Mehra Process is described in several U.S. Patents, including U.S. Pat. Nos. 4,623,371, 4,832,718, and 5,551,952, which are hereby incorporated herein by reference. These patents describe systems for absorption/flash regeneration systems for removal of light components such as nitrogen or hydrogen from heavier components such as methane or ethylene. An improvement to these processes is also described in U.S. Pat. No. 6,698,237, by Thomas K. Gaskin, which addresses use of stripping gas to enhance the performance of flash regeneration systems. A single variation of the Mehra Process utilizing vapor recycle in the flash regeneration of solvent absorption systems is considered in U.S. Pat. No. 5,321,952.

In the Mehra Process, the heavier components are absorbed away from the light component(s) using a circulating physical solvent, typically at a reduced temperature in the range of +60 to −40° F. Reducing the pressure of the rich solvent in a flash separator releases the heavier component and regenerates the solvent for recirculation to the absorber. The physical solvent can be a liquid chosen for its physical properties, one property being that it is heavier than the component to be absorbed from the light component. The physical solvent can also be made up entirely of the heaviest components of the multi-component gas stream stream. These heaviest components are those that do not readily vaporize in the flash regeneration of the circulating solvent. These absorption processes are characterized in that a feed stream comprising multiple components enters the process and two or more streams, each being enriched in at least one of the components, leaves the process. Any improvement to the process that results in increasing the purity of one or more of the exiting streams, increases the process efficiency, or improves process implementation cost or reliability will be appreciated as a technical contribution to the art.

BRIEF SUMMARY OF THE INVENTION

One aspect of the present invention is a process for separating the components of a multi-component gas stream by contacting the gas stream with a solvent in an extractor to produce an overhead stream that is enriched in at least one of the components and a solvent bottoms stream that is enriched in at least one of the other components that is absorbed by the solvent. The enriched solvent bottoms stream is then flashed in at least one reduced pressure stage to release the absorbed component(s) from the solvent, thereby regenerating lean solvent and providing the released component(s) as an overhead gas stream. The released component(s) stream can be compressed to produce a product stream. According to the present invention, the absorption takes place at a cryogenic temperature of about $-120°$ F. or lower. This reduction in temperature can be accomplished using pressure drop auto-refrigeration utilizing a JT valve, an expander, or a hydraulic turbine, and/or using temperature cascade refrigeration, thereby reducing the solvent circulation volume and process energy requirements.

Gas stream components can be separated utilizing either absorption technology or cryogenic fractionation technology, but surprisingly, combining these technologies into one system that uses absorption technology at cryogenic temperatures surpasses the abilities of either individual process to efficiently separate components.

DESCRIPTION OF PREFERRED EMBODIMENTS

Figure 1:
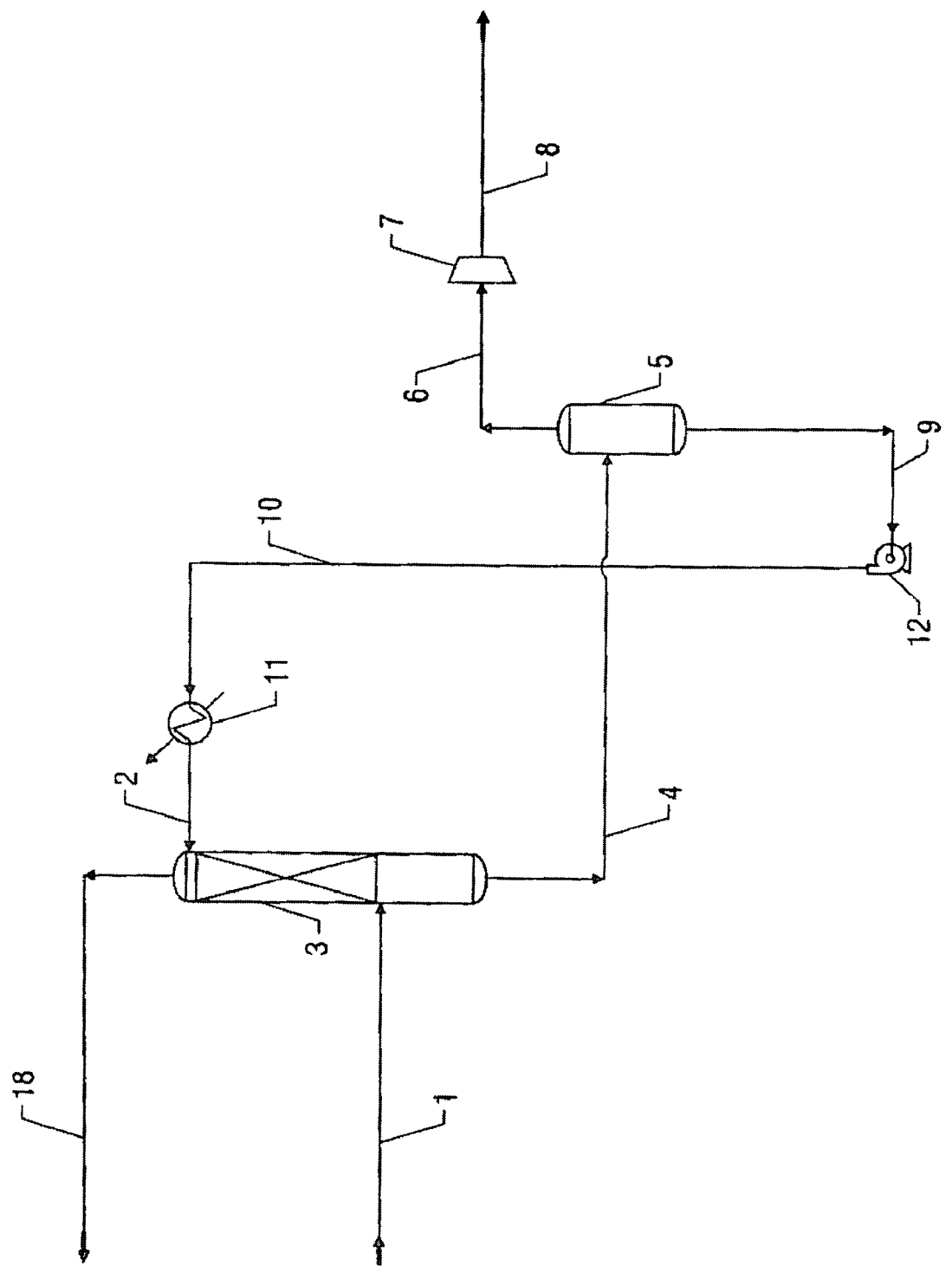
FIG. 1 shows a prior art absorption process for separating the components of a gas stream.

It should be understood that pipelines are in fact being designated when streams are identified hereinafter and that streams are intended, if not stated, when materials are mentioned. Moreover, flow control valves, temperature regulator devices, pumps, compressors, and the like are understood as installed and operating in conventional relationships to the major items of equipment which are shown in the drawings and discussed hereinafter with reference to the continuously operating process of this invention. All of these valves, devices, pumps, and compressors, as well as heat exchangers, accumulators, condensers and the like, are included in the term "auxiliary equipment". The term, "absorber," is conventionally employed for a gas/solvent absorbing apparatus, but when utilized in the process of this invention with a physical solvent, it is considered to be an "extractor." As used herein, "extractor" refers to any apparatus known in the art in which a gas is contacted with a solvent to absorb part of the gas into the solvent. According to certain embodiments, the extractor can include internals such as plates, packing, baffles and the like, to promote mass transfer. As used herein, referring to a process step as producing a stream that is enriched in a certain component or components means that the fractional percentage of that component or components in the produced stream, relative to the other components, is greater than the relative percentage of that component or components in the stream entering the process step.

One aspect of the present invention is a process for separating the components of a multi-component gas stream by contacting the gas stream with a solvent to produce an overhead stream that is enriched in at least one of the components and a rich solvent bottoms stream that is enriched in at least one of the other components. This contacting step is typically performed in an extractor. Typically the solvent absorbs the heavier component(s) of the multi-component stream, leaving the lighter component(s) as the overhead stream. The enriched solvent bottoms stream is flash evaporated in at least one reduced pressure stage to release the absorbed component(s), thereby regenerating the solvent and providing the absorbed component(s) as an overhead stream. The regenerated solvent is recycled to the extractor.

It has been recognized that reduced temperature sometimes aids absorption separation technology, however, the minimum temperature utilized has been limited to that achievable utilizing a propane refrigeration system, leading to a minimum process temperature of approximately $-40°$ F. for the absorption. Cryogenic processes, which do not require use of a solvent to achieve component separation, typically operate at temperatures of $-120°$ F. or lower, depending on the temperature required to condense at least one of the heavier multi-component gas stream components. The present invention combines these technologies as a solvent absorption-based separation plant operating at cryogenic temperatures. As a result of this combination, the temperature required to achieve high purity of the light component is not as low as is required utilizing the cryogenic technology alone, and the solvent circulation rate is not as large as is required when absorption-based technology is utilized at temperatures above the cryogenic range. The benefits of this synergy include lower process propensity for component freezing than a purely cryogenic process, while allowing use of lighter solvents, lower circulation rates, lower energy usage, and lower solvent losses to either light or heavy products.

The present invention utilizes options available to either technology group effectively. The cryogenic temperatures of the present invention can be achieved by reducing the pressure of the multi-component gas stream, for example, using a JT valve. The pressure reduction can also be taken across an expander or turbo-expander or hydraulic turbine. Heat exchange with internal process streams or with streams leaving the process can also be used to achieve the desired cryogenic temperature; either with or without use of pressure drop in the multi-component gas stream. Pressure reduction can also be used on any of the internal process streams or on streams leaving the process in order to achieve better heat exchange to help achieve the desired cryogenic temperatures. Refrigeration can also be utilized to achieve the cryogenic temperatures. The refrigeration can be accomplished by a stand-alone refrigeration system or by recirculating a portion of a stream that is an integral part of the process. Other cryogenic methods such a reboiling the tower to increase purity of the bottoms product can be applied to this invention. A stand-alone cryogenic facility often uses reflux condensed from the tower overhead to increase purity of the overhead (light) product. The combination of cryogenic and absorption technology of the present invention meets the purity requirement on the light components so that overhead reflux is not required.

According to the present invention, any of the absorption options known in the art can be applied to cryogenic absorption. These options include use of multiple flash regeneration steps instead of a single step, use of stripping gas to remove additional heavy components from the solvent, use of heavy product recycle to enhance separation of lighter components from the heavier components, use of flash gas from the first flash as recycle to the absorber to enhance separation of light components from the heavy components, use of a tower for any of the flash steps to enhance separation with or without the use of striping gas or heat application (reboiling of a tower, or preheating before a flash or tower application), and use of heat exchange of the produced products with the feed, or heat exchange with any internal streams or with a refrigeration system. Additional absorption options that are applicable to this invention include hydraulic turbines rather than valves when the pressure of a liquid is reduced and allowed to flash, allowing one or more flashes or towers to operate at or below atmospheric pressure to further remove a component from the circulating solvent, and placing the entire system described in this invention downstream of a an alternative technology, such as a membrane, pressure swing absorption (psa), or cryogenic system that does not use solvent.

Auto-refrigeration of the solvent as pressure is reduced is greater in the present invention than in previous systems because the present invention uses less solvent than the prior art absorption processes. As such, in some cases the rich solvent should be reheated to prevent extremely cold temperatures that may cause freezing of some components or reduce the amount of a component that is released from the solvent during a flash step.

The solvent used for this invention can be either an external solvent added to the system, or the solvent can be a portion of the heavier components that are part of the multi-component gas stream to the process. According to one embodiment, preferable external solvents are lighter than solvents that are typically used in the prior art. An external solvent is chosen by ability to accomplish the absorption, cost to purchase, and losses of solvent that requirement replacement. Losses of solvent also mean that one or more products have become contaminated with the solvent. According to some embodiments of the present invention, solvents having a carbon number above 4 will typically not be appropriate, because $C_{5+}$ components may solidify under the conditions of the process. $C_{5+}$ and heavier solvents were typically used for the prior art absorption processes. Use of lighter external solvents is possible due to the cryogenic temperatures. A $C_4$ solvent, such a normal butane or iso-butane can be used without significant losses of made-up or purchased solvent, or significant contamination of separated gas products. Due to the cryogenic temperatures, the ability to use a solvent made up of components contained in the inlet gas are more likely than in the absorption prior art. In the case of nitrogen rejection from natural gas containing nitrogen, methane, ethane, and propane, in some cases the contained ethane and propane can be used as the solvent. In some cases excess solvent is created (accumulated in the system), is available as a third product produced by this invention, in addition to the rejected nitrogen-rich stream and the methane-rich natural gas stream. Whether a system uses external solvent or solvent contained in the multi-component gas stream, the amount of heavier components and their freezing point is important. Components heavier than $C_5$ may solidify at the temperatures encountered in this invention. These heavier components are removed as the multi-component gas stream is cooled and they condense, thereby allowing these heavy components to be removed from the system before reaching a part of the process where the temperature is cold enough to allow solidification.

The separated heavy component stream can be further fractionated for return of lighter components if desired. Because the present invention utilizes a solvent for light product purification rather than reflux, the lowest temperature in the process is warmer than cryogenic processes that do not use solvent, and therefore the present invention is more tolerant of components that can freeze at cryogenic conditions, including but not limited to $C_{5+}$ components, carbon dioxide, and aromatics.

The process of the present invention is generally applicable to any multi-component gas stream, wherein the different components of the gas stream have different solubilities in a hydrocarbon solvent. The multi-component gas stream will typically contain one or more hydrocarbons. Generally, the heavier component(s) of the gas stream will preferentially absorb into the solvent, generating a solvent bottoms stream that is enriched in the heavier component(s) and an overhead stream that is enriched with the lighter component(s). For example, the multi-component gas stream can contain nitrogen and methane. Contacting such a gas stream with a solvent, according to the present invention, will produce a solvent stream that is enriched in methane and an overhead stream that is enriched in nitrogen. If the multi-component gas stream contains hydrogen and methane, contacting the stream with a solvent will produce an overhead stream enriched with hydrogen and a solvent bottoms stream enriched with methane. More complicated multi-component gas streams are possible, for example, gas streams comprising components selected from hydrogen, helium, nitrogen, methane, ethylene, ethane, heavier saturated and unsaturated hydrocarbons (e.g., $C_{3+}$) and mixtures thereof.

Aspects of the present invention can be better understood with reference to the drawings and the following discussion of the embodiments depicted in the drawings. Where numbered components are not specifically discussed in the text, they can be assumed to have the same identity and purpose as the corresponding numbered component in the discussion of the previous or prior drawings.

FIG. 1 shows a prior art process lacking any gas recycle step. According to the process of FIG. 1, hydrocarbon multi-component gas stream 1 is counter-currently contacted with lean solvent 2 in extractor 3, generating an overhead stream 18 and a rich solvent bottoms stream 4. The rich solvent bottoms stream 4 is directed to one or more flash separators 5. The number of separators can vary. According to one embodiment, there is a single flash separator 5. The component absorbed in the solvent is released in separator 5, and forms vapor stream 6. While only one flash stage is depicted in FIG. 1, multiple separators could be used. The pressure of stream 6 is elevated via compressor 7, yielding stream 8 as a product stream of the process. The regenerated lean solvent leaves separator 5 as a liquid stream 9 and is returned to extractor 3 as stream 10 via pump 12. Lean solvent stream 10 can be cooled in solvent cooler 11 prior to re-entering the extractor 3. If the multi-component gas stream 1 entering the process of FIG. 1 contains methane and nitrogen, for example, natural gas contaminated with nitrogen, then stream 18 will be enriched with nitrogen and stream 8 will be enriched with methane. However, stream 8 is often contaminated with a significant amount of nitrogen because nitrogen co-absorbs with methane into the solvent. Ideally, contacting stream 1 with solvent would result in overhead stream 18 being nitrogen and stream 4 being solvent enriched only with absorbed methane. However, under real working conditions, feed composition and operating conditions result in an undesirable amount of nitrogen being co-absorbed into the solvent stream 4 along with the desired absorbed component, i.e., methane.

Figure 2:
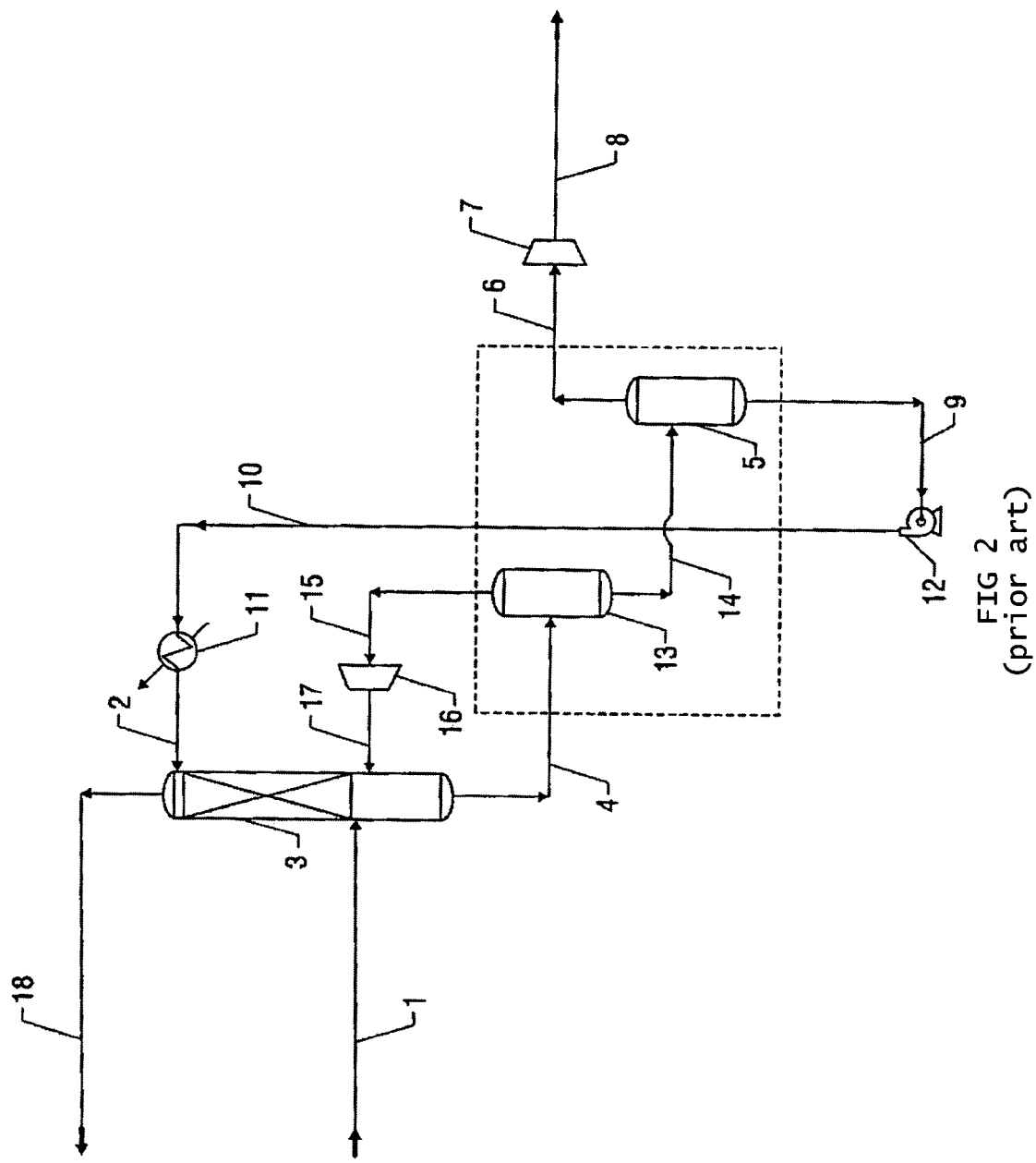
FIG. 2 shows a prior art absorption process for separating the components of a gas wherein the process includes recycling a portion of the overhead gas stream from a flash separator back to the extractor.

FIG. 2 shows a prior art process that reduces the amount that the product stream is contaminated with co-adsorbed light components. The process of FIG. 2 utilizes two flash-regeneration separators, intermediate flash 13 and final flash 5. Overhead stream 15 from intermediate flash 13 is recompressed by recycle compressor 16 and recycled to extractor 3. Final flash 5 generally operates at a lower pressure than intermediate flash 13. Because nitrogen is a lighter component than methane, intermediate flash 13 preferentially releases the co-absorbed nitrogen and preferentially leaves the desired methane in the enriched solvent 14. Nitrogen rich gas stream 15 is recompressed and returned to extractor 3, preferably at a point in the extractor that is equal to or below the multi-component gas stream stream 1. This results in stream 18 being further enriched with nitrogen. Removing co-absorbed nitrogen from stream 4 results in final product stream 8 to containing less nitrogen. The process according to FIG. 2 provides a higher purity product stream but requires an additional nitrogen compressor 16 and an additional flash stage 13.

Figure 3:
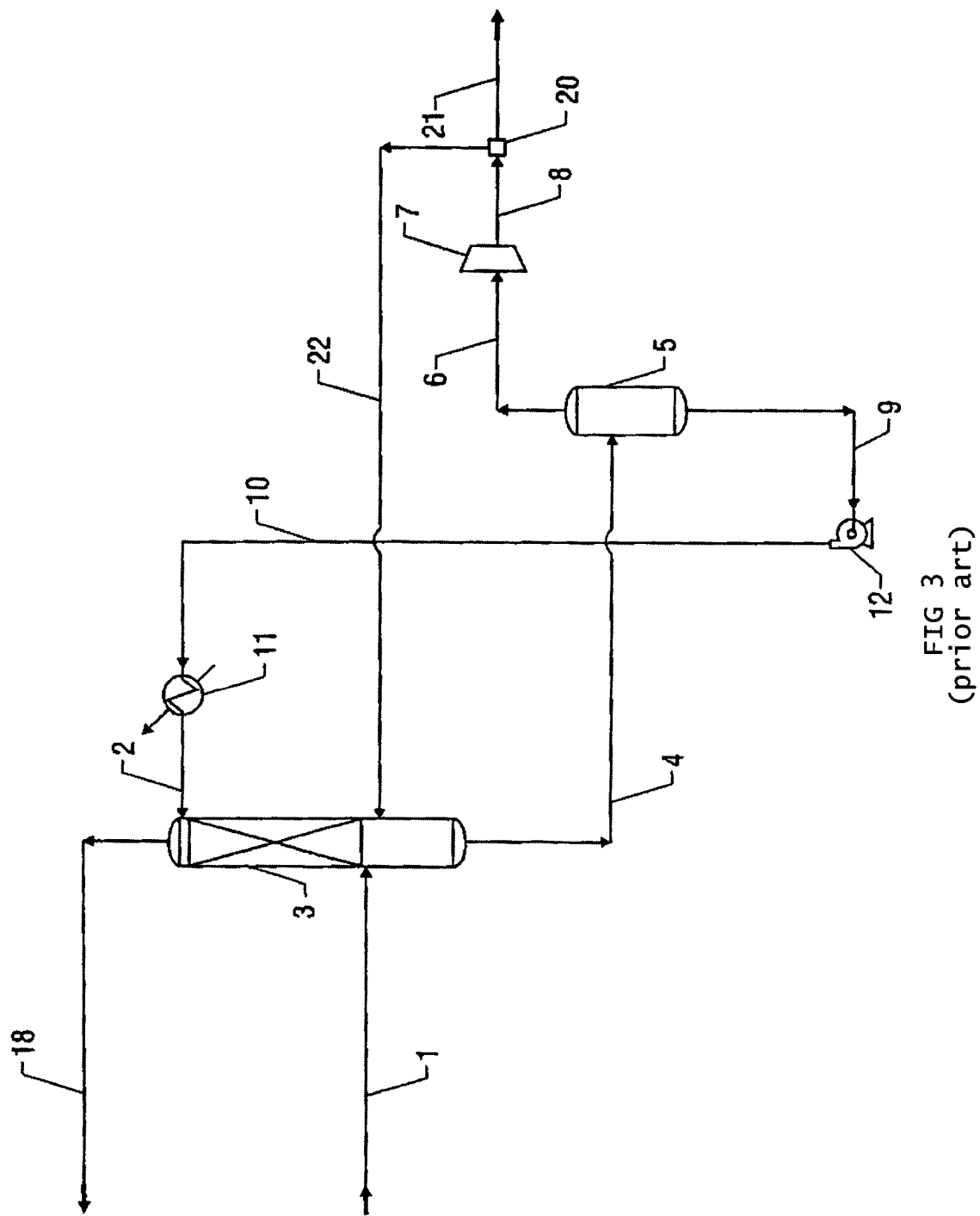
FIG. 3 shows a prior art absorption process for separating the components of a gas stream wherein the process includes recycling a portion of the total absorbed heavier component back to the extractor.

FIG. 3 shows a prior art process wherein a portion of the absorbed/released component(s) is recycled to extractor 3 from further along the process stream. A multi-component gas stream 1 is counter-currently contacted with lean solvent 2 in extractor 3, generating an overhead stream 18 and a rich solvent bottoms stream 4. The rich solvent bottoms stream 4 is directed to one or more flash separators 5. The number of separators can vary. The absorbed component is released as stream 6 by separator 5. This stream is compressed via compressor 7 to a become stream 8. The regenerated lean solvent leaves separator 5 as liquid stream 9, is returned via pump 12 to extractor 3 as stream 10. Lean solvent stream 10 can be cooled via solvent cooler 11 prior to re-entering the extractor 3. As depicted in FIG. 3, a portion of the product stream 8 is diverted via split 20 and recycled to extractor 3 as stream 22. Stream 22 typically enters the extractor at a point equal to or below the feed stream 1. The portion of product stream 8 that is not recycled, stream 21, is the net product stream. In the case of separation of nitrogen and methane, recycle of a portion of the product stream 8 is beneficial even though that stream may already meet product specifications for remaining nitrogen content. This is because recycling a portion of this stream to extractor 3 adjusts the composition in the bottom of the extractor, further enriching stream 4 with methane. This is a different approach than in FIG. 2, where stream 15 from the first flash separator may be enriched in nitrogen. This nitrogen-rich stream is likely to cause the nitrogen content of the total methane product to exceed specification if it were included in the product methane. According to the embodiment depicted in FIG. 2, nitrogen rich stream 15 is recycled to avoid including the nitrogen in the methane product. This requires a dedicated recycle compressor (shown as 16 in FIG. 2). Contrarily, in FIG. 3, a methane rich stream 22 prevents the flashed vapors from being off-specification for nitrogen in the methane product. The recycle method eliminates the need for the dedicated recycle compressor and can also eliminate the need for a first flash vessel.

Figure 4:
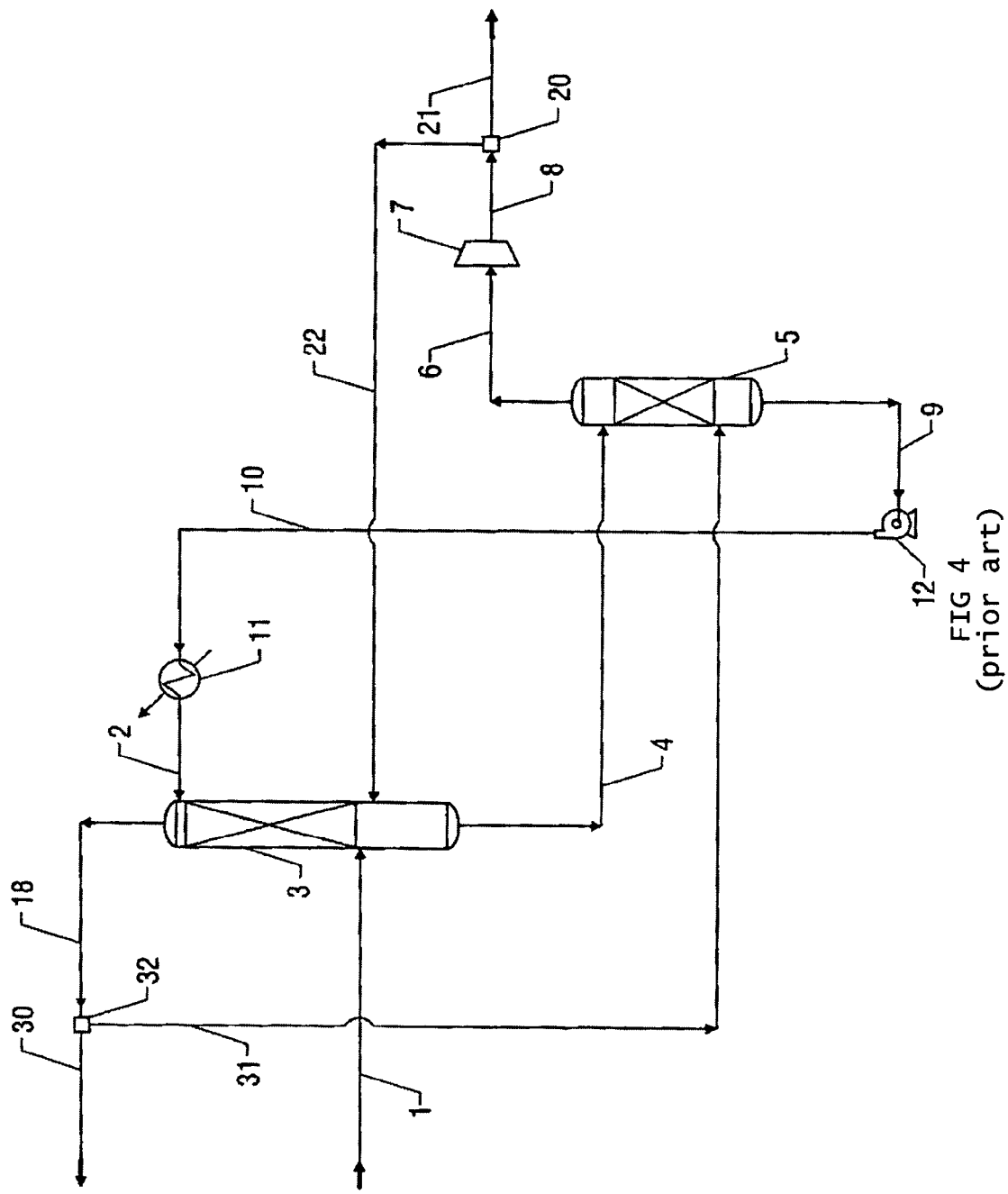
FIG. 4 shows a prior art absorption process for separating the components of a gas similar to the process of FIG. 2 and FIG. 3, but with stripping gas also provided to one or more flashes.

Prior art that is an alternative embodiment of the process depicted in FIG. 3 is shown in FIG. 4. In this embodiment, a portion of the light, unabsorbed component 18 is diverted via splitter 32 and directed as stream 31 to flash separator 5, where it is used a stripping gas. Stripper columns can also be used instead of flash vessels and multiple stripper columns or flash separators can be used. Introduction of the light component (nitrogen, for example) causes more of the absorbed component (methane, for example) to be stripped from the circulating solvent, allowing higher percent recovery of the absorbed component (methane) by allowing circulation of a leaner lean solvent stream to the extractor.

Figure 5:
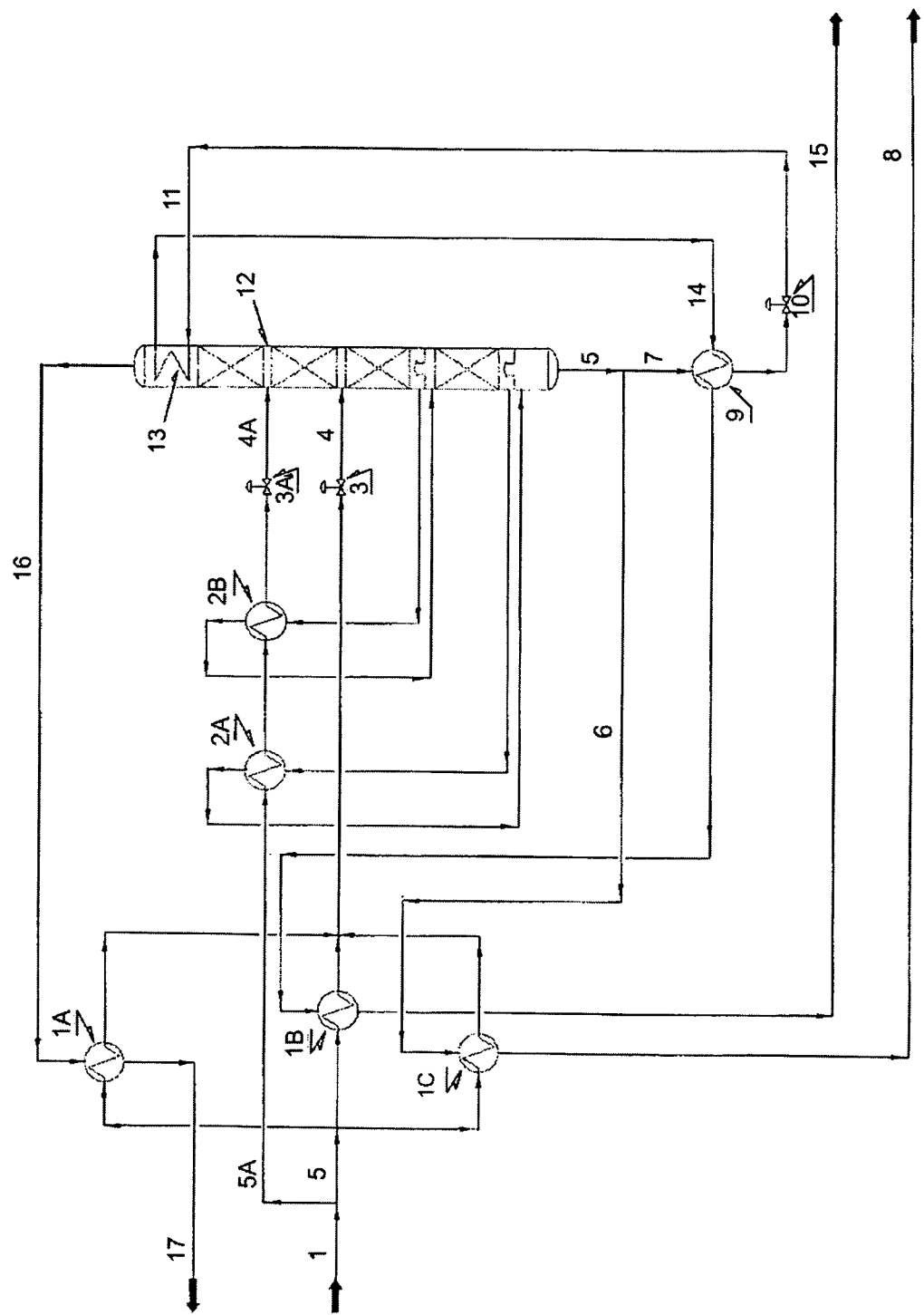
FIG. 5 shows a prior art cryogenic process for separating the components of a of a gas stream utilizing heat exchange, JT pressure drop temperature reduction, and reboiled and refluxed fractionation.

FIG. 5 shows a prior art cryogenic process incorporating heat exchange, JT pressure reduction, fractionation tower with reboiling and reflux, and without the use of solvent. In this embodiment of a cryogenic separation process the multi-component gas stream stream 1 is split into streams 5 and 5a. Stream 5 is further split and cooled in heat exchangers 1a, 1b, and 1c, and the recombined stream 5 is then let down in pressure using JT valve 3, exiting the JT valve as a much colder, and lower pressure stream 4. Stream 4 enters the fractionating tower 12 at a midpoint. Stream 5a is cooled in exchangers 2a and 2b, let down in pressure using JT valve 3a, exiting the JT valve as a much colder and lower pressure stream 4a. Stream 4a enters the tower 12 at or above the stream 4 feed point. The fractionating tower includes trays, packing, or other mass transfer contacting devices to encourage separation of the components. The lower part of the tower is reboiled using heat recovered in exchangers 2a and 2b to provide the heat to partially vaporize the liquid in the bottom sections, thereby providing stripping gas to purify the bottoms product stream 5. Bottoms product stream is split into stream 6 and 7. Stream 6 is reheated in exchanger 1c and leaves the system as a medium pressure heavy component stream 8. Stream 7 is further cooled in exchanger 9, and reduced in pressure using valve 10, existing valve 10 as stream 11. Stream 11 is cooler than tower feed stream 4, and as such can provide cooling to partially condense and form reflux liquid at the top of the tower 12. This is accomplished using internal dephlegmator 13. Stream 11 exits the dephlegmator as stream 14, is partially reheated in exchanger 9, further reheated in exchanger 1b, and exits the process a low pressure heavy product, stream 15. The tower 12 overhead product exits the dephlegmator as stream 16, is reheated in exchanger 1a, and exits the process as the light component product stream 17. Individual exchangers depicted in FIG. 5 can be combined into a single exchanger.

Figure 6:
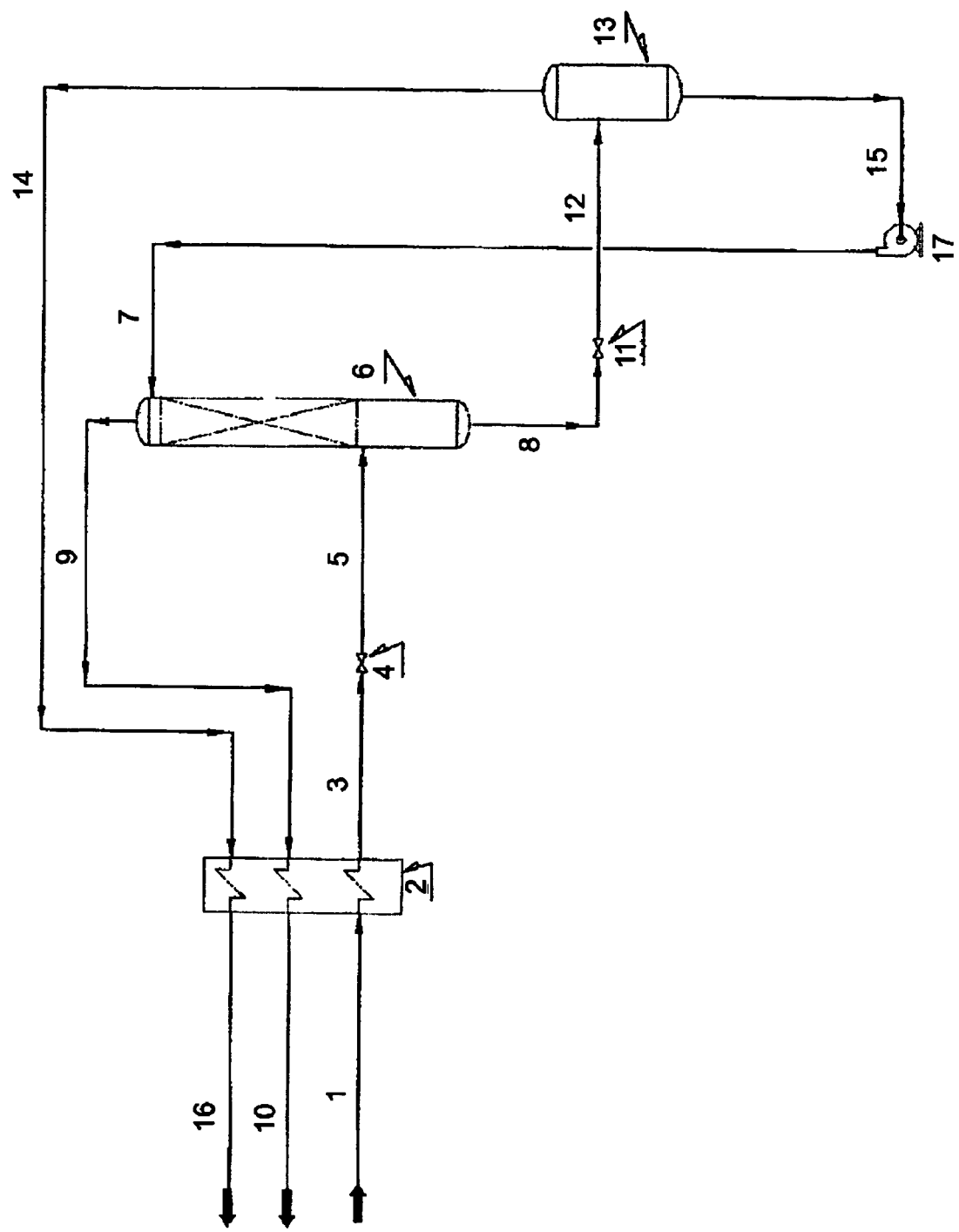
FIG. 6 shows a process according to the present invention for separating the components of a gas similar to the absorption process of FIG. 1, but also providing use of a process including pressure reduction, heat exchange, or cryogenic refrigeration to achieve cryogenic operating temperatures for the absorption process.

FIG. 6 depicts an overview of the basic components of the present invention. A multi-component gas stream stream 1 is cooled in exchanger 2, exiting as stream 3, and is further cooled and pressure reduced via JT valve 4 (or other device) to become stream 5. Stream 5 is contacted with lean solvent stream 7 in extractor 6. The light component of the feed exits the top of extractor 6 as stream 9, and is reheated in exchanger 2 and leaves the process as light component stream 10. The rich solvent stream 8 exits the bottom of extractor 6, and contains the lean solvent and the heavier component of the multi-component gas stream. This rich solvent is reduced in pressure using valve 11 (or other device) and enters flash vessel 13 as stream 12. This flash step allows separation of the liquid rich solvent into a vapor and a liquid stream, stream 14 being the vapor and stream 15 being the liquid. The vapor stream 14 contains the heavier multi-component gas stream component, and it is reheated in exchanger 1 and leaves the process as stream 16. Stream 15 is increased in pressure using pump 17, and re-enters extractor 6 as solvent stream 7.

Figure 7:
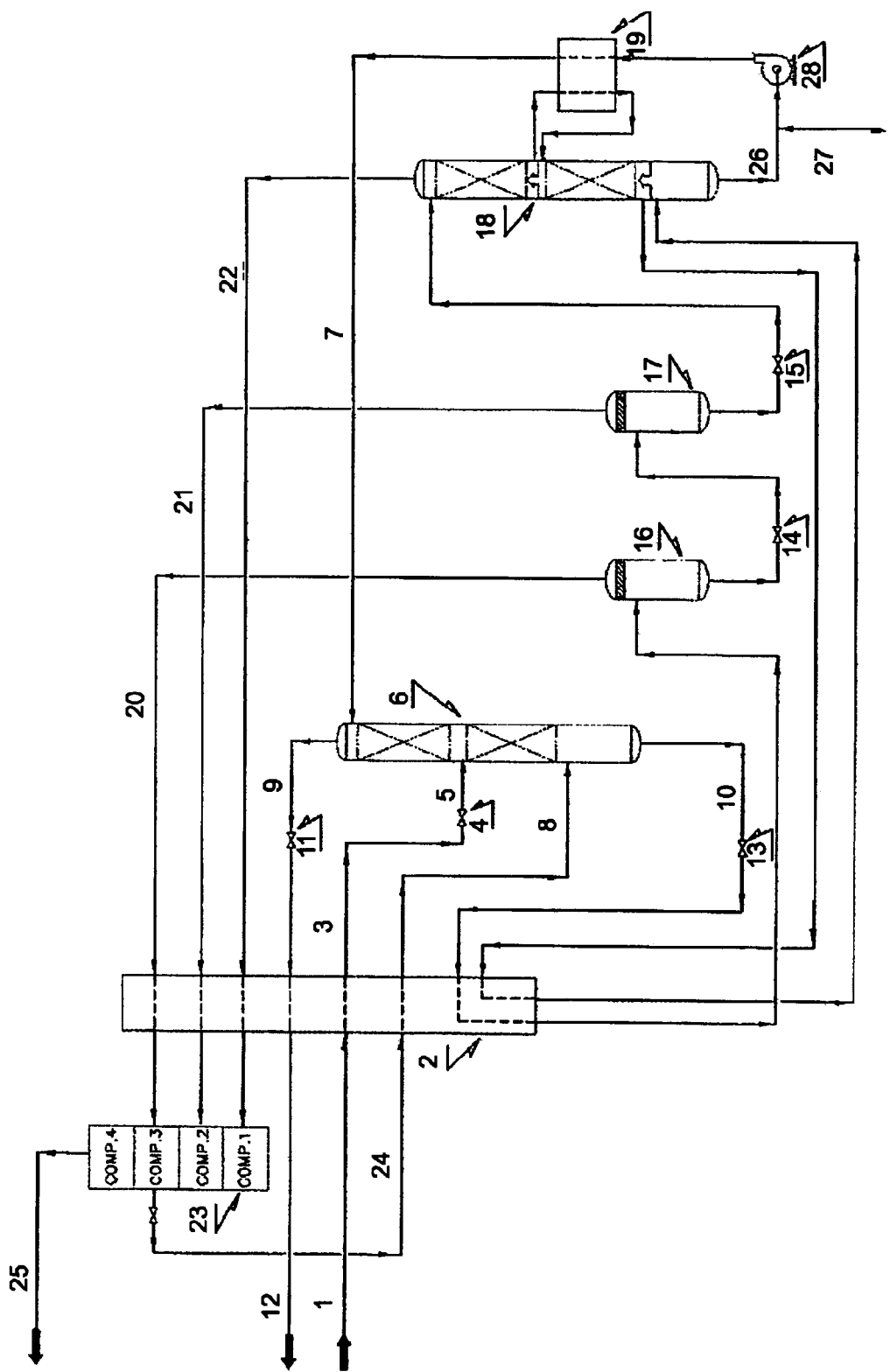
FIG. 7 shows a process according to the present invention similar to the process of FIG. 6, but also providing absorber bottoms reheat, multiple flashes, use of a reboiled tower as the last solvent flash, and incorporating additional heat exchange and product recycle.

FIG. 7 depicts a further embodiment of the present invention including multiple solvent flashes, reboiling of the final flash as a tower, side reboiling of the final flash tower, heavier product recycle to the extractor, and reheat of the extractor bottoms. The basic components from FIG. 6 are also included. The process depicted in FIG. 7 can produce light and heavy products that are more pure than produced by the process of FIG. 6 in a more energy efficient manner. Note that heat exchangers are depicted as plate-fin boxes with multiple cores, however individual exchangers can also be utilized. Multi-component gas stream 1 is cooled in exchanger 2, exiting as stream 3, is further cooled and pressure reduced in valve 4 (or other device) and enters the midpoint of extractor 6 as stream 5. Lean solvent 7 enters the top of the extractor, and a recycled portion of the heavy product, stream 8, enters the bottom of the extractor. The lean solvent absorbs heavy components from the multi-component gas stream, causing the extractor overhead stream 9 to be a substantively pure light component of the multi-component gas stream, and the recycled heavy product stream 8 causes stripping of co-absorbed light components from the solvent, causing the extractor bottoms liquid product, the rich solvent stream 10 to be substantially solvent components and heavy multi-component gas stream components. Stream 9 is reheated in exchanger 2 for heat recovery. An optional pressure drop device 11 is indicated, and can be employed if additional cooling is desired to enhance the available heat exchange. The reheated stream 9 exits the process as light component(s) stream 12. The rich solvent stream 10 is reduced in pressure with valves (or other devices such as hydraulic turbines) 13, 14 and 15 in order to release the absorbed heavy component from the solvent at lower pressure, utilizing flash vessels 16 and 17, and tower 18 for separation of vaporized heavy components from the liquid solvent. The rich solvent stream 10 is shown as being partially re-heated in exchanger 2 to enhance vaporization of the heavy components of the solvent. The tower 18 is indicated as having a bottoms reboiler and a side reboiler to further enhance vaporization of the absorbed heavy component from the solvent, with the bottom reboiler being indicated as a part of exchanger 2, and the side reboiler being exchanger 19. Released heavy component vapor streams 20, 21 and 22 all contain portions of the heavy component, and are indicated as being compressed in stages 1, 2, and 3 of a gas compressor 23. A portion of this compressed gas is recycled to heat exchanger 2 as stream 24, and is stream 8 after being cooled in exchanger 2. Compressor interstage coolers are not indicated in the FIG. 7. The separated heavy component(s) from the multi-component gas stream exits the process as stream 25 from the last stage of the compressor. The bottom liquid from tower 18 is the regenerated lean solvent, stream 26. There may be an excess of solvent produced (recovered from the multi-component gas stream), and if so it can be removed as separate heavy product stream 27. Alternatively, if make-up of heavy solvent is required to maintain solvent inventory, then stream 27 represents this make-up requirement. The lean solvent is increased in pressure using pump 28, exits the pump as stream 29, is cooled in side reboiler 19 exiting as the recirculating lean solvent stream 7 to the extractor.

Figure 8:
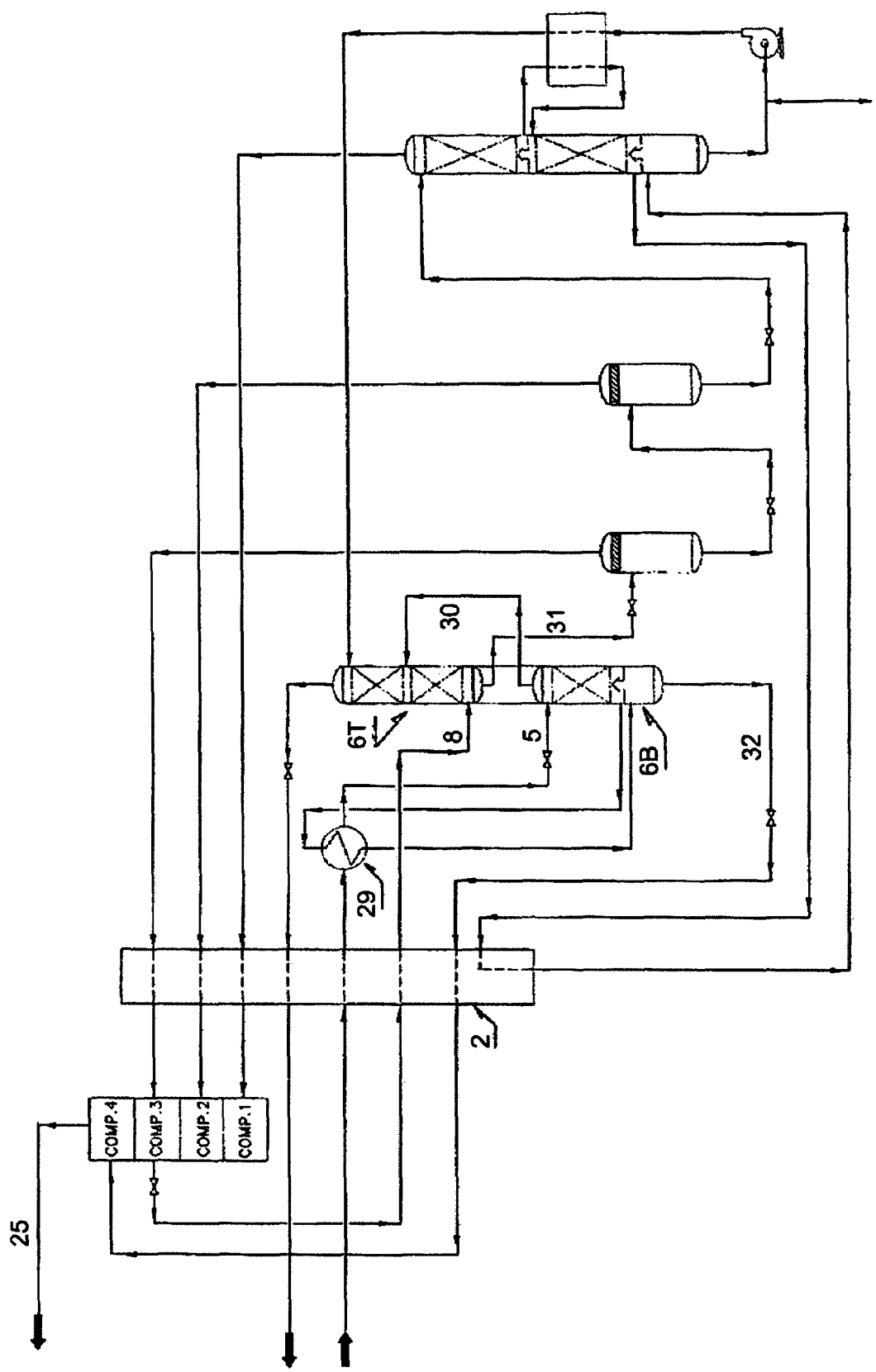
FIG. 8 shows a process according to the present invention similar to that of FIG. 7, but also providing for separation of a portion of the multi-component gas stream to meet heavy product specifications without contacting the circulating solvent.

FIG. 8 is a further embodiment of the present invention. Extractor 6 is split into a top and bottom section, 6t and 6b, with heat exchanger 2, and additional heat exchanger 29. The multi-component gas stream is cooled as in FIG. 7, but receives part of the cooling in exchanger 29, which is the extractor bottoms section 6b reboiler. The multi-component gas stream is reduced in pressure as in FIG. 7, and enters the top of extractor section 6b. In the embodiment of FIG. 8, the recycled portion of the heavy product, stream 8, now enters the bottom of the extractor top section 6t, the overhead flow from 6b, stream 30, enters the midpoint of extractor 6t, and the rich solvent from the top section 6t of the extractor is removed as stream 31. The rich solvent is regenerated and the absorbed heavy components removed from the solvent as in FIG. 7. The bottom section of the extractor, 6b, does not use the solvent. The liquid portion of the cooled multi-component gas stream, stream 5, is purified of light components by stripping gas provided by the heat from the new reboiler 29, and can leave the extractor as stream 32, and after being reheated and compressed as necessary becomes a portion of the total heavy component product, stream 25. Note that when stripping of the solvent in 6t is not required to meet product requirements vapor stream 30 from 6b can directly enter the bottom of 6t, effectively making 6t and 6b one tower, separated by a chimney tray for removal of stream 31.

Figure 9:
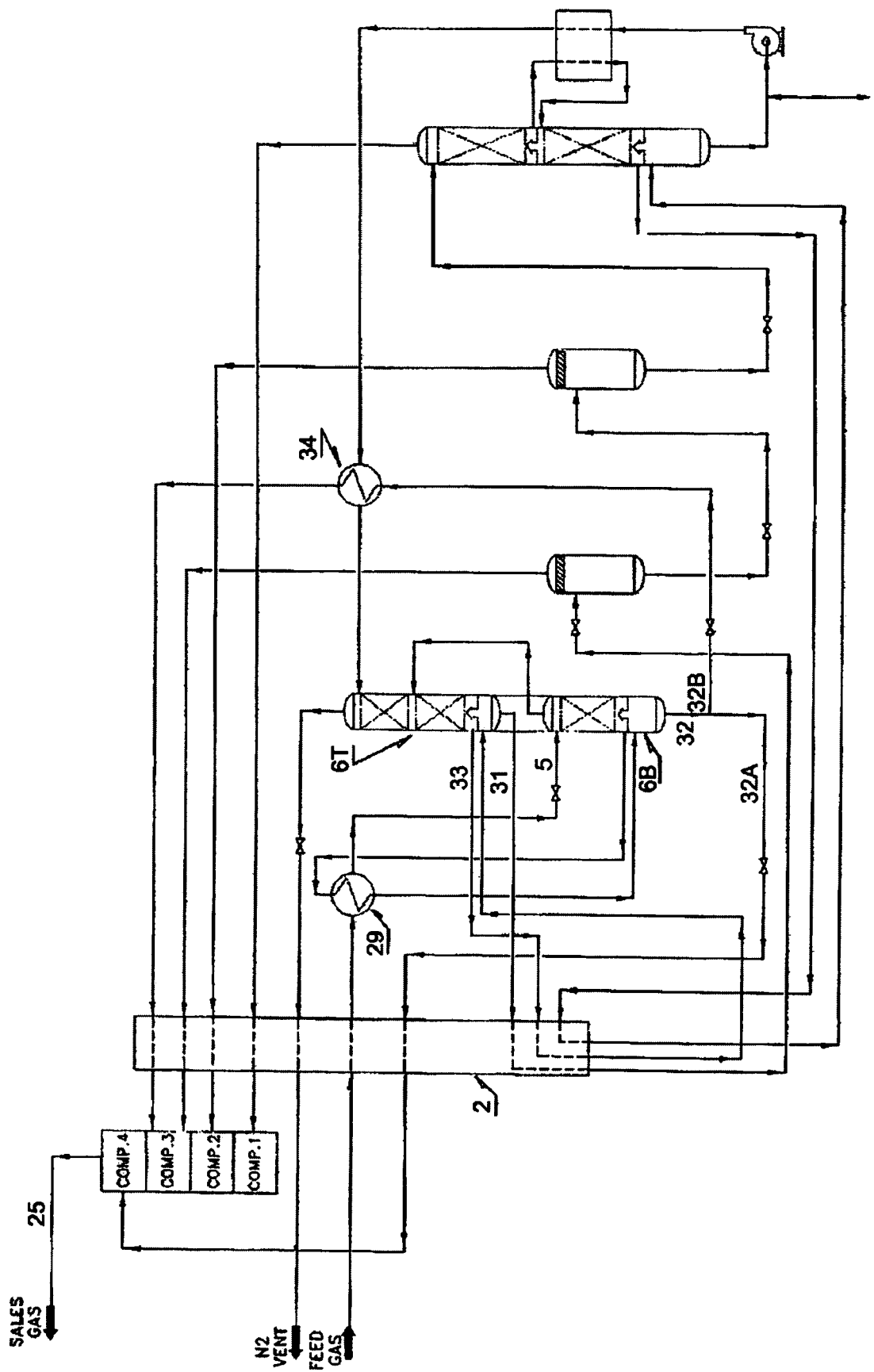
FIG. 9 shows a process according to the present invention similar to that of FIG. 8, but also providing absorber reboiling and reheat of absorber bottoms, deleting use of product recycle, and providing additional heat exchange.

FIG. 9 depicts a further embodiment of the present invention, with many similarities to the embodiment of FIG. 8. In this embodiment, the heavy product recycle stream 8 of FIG. 8 is not used to purify extractor 6t bottoms stream, and this purpose is accomplished using a reboiler, indicated as being a section of exchanger 2, and being fed by stream 33. A second change from the process of FIG. 8 is that the rich solvent stream 31 from extractor 6t is partially reheated in exchanger 2 prior to being regenerated. Also, the 6b bottoms stream 32 is split into two streams, 32a and 32b. 32a is reheated as in FIG. 8. 32b is let down in pressure and is used to provide additional solvent cooling in exchanger 34, prior to being reheated in exchanger 2 and entering the heavy product compressor.

EXAMPLE

This Example compares the process of the present invention, as described in FIG. 7, FIG. 8 and FIG. 9 with the prior art processes described in FIG. 2 and FIG. 5 with regard to their ability to process a gas stream comprising methane and nitrogen in order to produce a methane stream that meets typical pipeline quality for inert content. The comparison is conducted under conditions such that a fair comparison of the absorption process of FIG. 2 and cryogenic process of FIG. 5 can be made with three forms of the present invention combining these two technologies as indicated in FIG. 7, FIG. 8, and FIG. 9. Three criteria are used for the comparison of the prior art with the present invention: 1) ability to separate the components, 2) compression horsepower required and 3) tolerance for contaminants that can cause freezing in the process. In order to correctly evaluate item 2, compression horsepower requirement, the purified methane product has been compressed to the same pressure in each process. Note that for the prior art process of FIG. 2, additional flash stages were included, as this is typical for actual installations of this process The multi-component gas stream composition used is 15% molar nitrogen, 84% molar methane and 1% molar ethane, and has a flow rate of 15.00 MMscfd, temperature of 120° F., and pressure of 950 psig. The heavy product is recompressed to a pressure of 935 psig in all cases. VM&P Naphtha is the solvent used in prior art FIG. 2. Normal and/or iso-butane is the solvent used for the process in FIGS. 7, 8, and 9. All of these processes can achieve substantially the same separation of the multi-component gas stream, producing a light stream comprising mostly nitrogen, and a heavy stream comprising mostly methane and ethane. Actual separation achieved, and other indicators are presented in the following table. All results are obtained using similar process simulation techniques.

| Process Used | % Recovery of Methane from Feed into Heavy Product | Nitrogen Content of Heavy Product, Mole % | Total Compression Horsepower Requirement | Pump Horsepower Requirement |
|---|---|---|---|---|
| FIG. 2 (prior art) | 98.51 | 3.02 | 2837 | 948 |
| FIG. 5 (prior art) | 99.40 | 3.10 | 2085 | — |
| FIG. 7 (present) | 99.56 | 2.94 | 2486 | 61 |
| FIG. 8 (present) | 99.44 | 3.12 | 1744 | 61 |
| FIG. 9 (present) | 99.86 | 2.99 | 1741 | 43 |

All processes achieve similar purification of methane, as indicated by similar nitrogen content in the heavy product. FIG. 2 has the lowest recovery of methane, FIG. 9 the highest, and FIGS. 5, 7 and 8 are similar. Higher recovery indicates not only more of the valuable methane is available as product, but also that the nitrogen product, or vent to atmosphere, is also a purer product. Higher recovery and purity increases value. In the case of FIG. 9, the purity of the nitrogen product is 99% molar. FIG. 9 also has the lowest compression and total operating horsepower, or energy usage to achieve the indicated separation. The embodiment of the present invention as depicted in FIG. 9 achieves the best separation, with the lowest energy usage. The embodiments of the present invention depicted in FIGS. 7 and 8 also have advantages. The embodiment of FIG. 8 achieves good separation, comparable with prior art, with low energy usage, and with less equipment required than FIG. 9. The embodiment of FIG. 8 is also very tolerant of carbon dioxide ($CO_2$) content in the multi-component gas stream. FIG. 2 can accommodate unlimited $CO_2$, FIG. 5 can accommodate approximately 1500 ppmv $CO_2$ in the feed without having $CO_2$ freeze in the process, FIGS. 7 and 9 can accommodate approximately 1000-1500 ppmv $CO_2$ in the multi-component gas stream without freezing. But the process of FIG. 8 can accommodate 5000 ppmv or higher. If ethane content were 2%, approximately 1% $CO_2$ can be tolerated, and with higher ethane content 2% $CO_2$ can be tolerated. Tolerance for $CO_2$ can allow a methane/nitrogen separation plant to operate without $CO_2$ removal equipment being installed upstream of the separation facility. One reason for the $CO_2$ tolerance of the FIG. 8 process is the minimum operating temperature in the process of −180 F. Minimum temperatures for the other processes are as follows: FIG. 2, −25° F.; FIG. 5, −253° F.; FIG. 7, −200° F.; FIG. 9, −193° F. A second reason for the tolerance of FIG. 8 process is that the $CO_2$ is removed early in the process and the stream that contains the majority of the $CO_2$ tower 6t bottoms does not have any additional pressure or temperature drop. The embodiment of FIG. 7 also has distinct advantages compared to the other processes. In this embodiment, any ethane, propane, or butane contained in the multi-component gas stream (if natural gas is the feed—if refinery gases are the feed, then ethylene, ethane, propylene, etc) is largely added to the solvent inventory, and as such can be separated as a third product from the process, achieving an additional separation of the multi-component gas stream without the addition of more equipment. This also eliminates any solvent make-up requirement for the process. At times the use of a solvent made-up of inlet component in the gas can also reduce energy consumption, as the solvent being circulated is typically a lower molecular weight when it is made up of feed components.

The embodiments of the present process presented indicate how combining the absorption process of prior art with cryogenic processes can achieve a synergistic affect wherein the performance achieved exceeds the ability of either process individually to achieve high feed component separation, minimize energy consumption and tolerate impurities in the feed.

All of the methods and apparatus disclosed herein can be made and executed without undue experimentation in light of the present disclosure. While the methods of this invention have been described in terms of specific embodiments, it will be apparent to those of skill in the art that variations can be applied to the methods and apparatus and in the steps or in the sequence of steps of the methods described herein without departing from the concept, spirit and scope of the invention. All such similar substitutes and modifications apparent to those skilled in the art are deemed to be within the spirit, scope and concept of the invention as defined by the appended provisional claims.

One of skill in the art will appreciate that enabled herein are methods and apparatuses for separating the components of a multi-component gas stream, by contacting the multi-component gas stream with a solvent in an extractor at a temperature of −120 F. or lower to produce an overhead stream that is enriched in at least one unabsorbed component gas and a rich solvent bottoms stream that is enriched in at least one absorbed component gas; flash evaporating the rich solvent bottoms stream in at least one reduced pressure stage to regenerate lean solvent and to produce an overhead stream that is enriched in the at least one absorbed component gas; and recycling the regenerated lean solvent to the extractor. According to one embodiment the multi-component gas stream contains at least one hydrocarbon. According to one embodiment the multi-component gas stream contains one or more components selected from the group consisting of hydrogen, nitrogen, helium, argon, carbon monoxide, carbon dioxide, methane, ethylene, ethane, heavier saturated and unsaturated hydrocarbons and mixtures thereof. According to one embodiment the unabsorbed component gas contains nitrogen. According to one embodiment the unabsorbed component gas contains hydrogen. According to one embodiment the product stream contains methane. According to one embodiment the solvent is one of the components of the multi-component gas stream. According to one embodiment the solvent is an external solvent that is added to the process. According to one embodiment the solvent is selected from the group consisting of paraffinic solvents lighter than $C_5$. According to one embodiment the multi-component gas stream is cooled to −120° F. or colder using one or more of the following means: heat exchange, refrigeration, pressure reduction auto-refrigeration. According to one embodiment the pressure reduction auto-refrigeration is accomplished using one or more of the following devices: a JT valve, a gas expander, a gas turbo-expander, an orifice, a hydraulic turbine, or other suitable means. According to one embodiment solvent pressure reduction is accomplished using one or more of the following devices: a valve, an orifice, a hydraulic turbine, or other suitable means. According to one embodiment vapor from the first solvent flash vessel is recycled to the extractor as stripping gas. According to one embodiment a portion of the heavy product is recycled to the extractor as stripping gas. According to one embodiment a portion of the light product is used to further purify the lean solvent in a flash vessel or in a tower. According to one embodiment the extractor is reboiled. According to one embodiment the extractor bottoms is heated prior to flashing. According to one embodiment a tower is used for solvent regeneration, and the tower is equipped with one or more reboilers. According to one embodiment all heat for the tower reboiler(s) is provided by heat exchange with other streams within the process. According to one embodiment the last flash operates at less than atmospheric pressure. According to one embodiment the last flash is a tower. According to one embodiment excess solvent is accumulated in the process and is drawn off as a separate product of the process. According to one embodiment the multi-component gas stream is pretreated for removal of contaminants that may freeze or otherwise adversely affect the process, including but not limited to water, carbon dioxide, and heavy hydrocarbons. According to one embodiment, the multi-component gas stream contains about 2% or greater carbon dioxide but carbon dioxide solids do not form in the system. According to one embodiment the multi-component gas stream is partially purified using other technology, including but not limited to membranes, pressure swing adsorption, molecular sieves, and reactors. According to one embodiment components of the feed that may freeze in the process are separated as a liquid phase as the multi-component gas stream is cooled and are withdrawn before their respective freezing temperature is reached. According to one embodiment a portion of the heavy component is separated in a vessel or tower prior to entering the primary extractor. According to one embodiment the initial heavy component separation tower is equipped with one or more reboilers. According to one embodiment the separated heavy component is utilized for heat exchange, with or without pressure drop of the recovered heavy component. According to one embodiment one or more process streams are reduced in pressure in order to provide additional low temperature cooling of the system via heat exchange. According to one embodiment the vapor product of the initial separation is routed to the extractor. According to one embodiment the extractor is a tower with internals to promote mass transfer. According to one embodiment the multi-component gas stream is counter-currently contacted with the solvent. According to one embodiment a portion of the heavy product is separated in the bottom section of a tower, and the top section of the tower is the extractor section utilizing solvent. The rich solvent is removed between the top and bottom section using a chimney tray or other device.

What is claimed is:

1. A process for separating the components of a multi-component gas stream, the process comprising:
    cooling the multi-component gas stream to a temperature of −120° F. (−84° C.) or lower using pressure reduction auto-refrigeration of the multi-component gas steam after heat exchange and before contacting the multi-component gas stream with a solvent in an extractor;
    contacting the multi-component gas stream with a solvent in an extractor at a temperature of −120° F. (−84° C.) or lower to produce an overhead stream enriched in at least one unabsorbed component and a rich solvent bottoms stream enriched in at least one absorbed component;
    flash evaporating the rich solvent bottoms stream in at least one reduced pressure stage to regenerate lean solvent and to produce an overhead stream enriched in the at least one absorbed component; and
    recycling the regenerated lean solvent to the extractor.

2. The process of claim 1, wherein the multi-component gas stream comprises at least one hydrocarbon.

3. The process of claim 1, wherein the multi-component gas stream comprises one or more components selected from the group consisting of hydrogen, nitrogen, helium, argon, carbon monoxide, carbon dioxide, methane, ethylene, ethane, saturated and unsaturated $C_{3+}$ hydrocarbons and mixtures thereof.

4. The process of claim 1, wherein the at least one unabsorbed component comprises nitrogen.

5. The process of claim 1, wherein the at least one unabsorbed component comprises hydrogen.

6. The process of claim 1, wherein the at least one absorbed component comprises methane.

7. The process of claim 1, wherein the solvent is one of the components of the multi-component gas stream.

8. The process of claim 1, wherein the solvent is an external solvent.

9. The process of claim 1, wherein the solvent is selected from the group consisting of paraffinic solvents lighter than $C_5$.

10. The process of claim 1, wherein the multi-component gas stream is cooled using pressure reduction auto-refrigeration and a heat exchanger or refrigeration unit.

11. The process of claim 1, wherein the multi-component gas stream is cooled using a pressure reduction auto-refrigeration device selected from the group consisting of JT valve, a gas expander, a gas turbo-expander, an orifice, a hydraulic turbine, and combinations thereof.

12. The process of claim 1, wherein the at least one reduced pressure stage comprises one or more devices selected from the group consisting of a valve, an orifice, and a hydraulic turbine.

13. The process of claim 1, comprising more than one reduced pressure stage and further comprising recycling a portion of the overhead stream of the first reduced pressure stage to the extractor as a stripping gas.

14. The process of claim 1, further comprising recycling a portion of the overhead stream enriched in at least one absorbed component to the extractor as stripping gas.

15. The process of claim 1, further comprising using a portion of the overhead stream enriched in at least one unabsorbed component to further purify the lean solvent.

16. The process of claim 1, further comprising reboiling the rich solvent bottoms stream.

17. The process of claim 1, further comprising heating the rich solvent bottoms stream before flash evaporating said stream.

18. The process of claim 1, wherein at least one of the reduced pressure stages is a tower equipped with one or more reboilers.

19. The process of claim 18, wherein heat for the tower reboiler(s) is provided by heat exchange with other streams within the process.

20. The process of claim 1, further comprising flash evaporating the overhead stream enriched in at least one absorbed component at atmospheric pressure.

21. The process of claim 20, wherein said flash evaporating occurs in a tower.

22. The process of claim 1, further comprising obtaining excess solvent that is accumulated in the process as a product of the process.

23. The process of claim 1, further comprising pretreating the multi-component gas stream to remove contaminants that may freeze at operating temperature.

24. The process of claim 23, wherein said contaminants comprise water, carbon dioxide, or heavy hydrocarbons.

25. The process of claim 1, further comprising treating the multi-component gas stream using a method selected from the group consisting of membranes, pressure swing adsorption, molecular sieves, and reactors.

26. The process of claim 1, further comprising cooling the multi-component gas stream and removing components of the multi-component gas stream that may freeze before the freezing temperature of said components is reached.

27. The process of claim 1, wherein the multi-component gas stream comprises a heavy component and the process further comprises separating a portion of the heavy component in a vessel prior to contacting multi-component gas stream the extractor.

28. The process of claim 27, wherein said vessel is equipped with one or more reboilers.

29. The process of claim 27, further comprising using the separated heavy component for heat exchange.

30. The process of claim 1, further comprising reducing the pressure of one or more of the gas streams to provide additional cooling of the process via heat exchange.

31. The process of claim 27 further comprising heating the separated heavy component to produce a vapor routing said vapor to the extractor.

32. The process of claim 1, wherein the extractor is a tower with internals to promote mass transfer.

33. The process of claim 1, wherein the multi-component gas stream is counter-currently contacted with the solvent.

34. The process of claim 1, wherein a portion of the heavy product is separated in the bottom section of a tower, and the top section of the tower is the extractor section utilizing solvent and wherein rich solvent is removed between the top and bottom section using a chimney tray or other device.

35. The process of claim 1, wherein multi-component gas stream contains greater than about 2% carbon dioxide and wherein carbon dioxide solids do not form in the process.

* * * * *